United States Patent
Vashisht et al.

(10) Patent No.: US 11,677,786 B1
(45) Date of Patent: Jun. 13, 2023

(54) SYSTEM AND METHOD FOR DETECTING AND PROTECTING AGAINST CYBERSECURITY ATTACKS ON SERVERS

(71) Applicant: FireEye, Inc., Milpitas, CA (US)

(72) Inventors: Sai Vashisht, Morgan Hill, CA (US); Ishan Sharma, Bangalore (IN)

(73) Assignee: FireEye Security Holdings US LLC, San Jose, CA (US)

( * ) Notice: Subject to any disclaimer, the term of this patent is extended or adjusted under 35 U.S.C. 154(b) by 433 days.

(21) Appl. No.: 16/557,483

(22) Filed: Aug. 30, 2019

Related U.S. Application Data

(60) Provisional application No. 62/826,875, filed on Mar. 29, 2019.

(51) Int. Cl.
*H04L 9/40* (2022.01)
*G06F 9/455* (2018.01)

(52) U.S. Cl.
CPC .......... *H04L 63/20* (2013.01); *G06F 9/45533* (2013.01); *H04L 63/1416* (2013.01); *H04L 63/1425* (2013.01); *H04L 63/1433* (2013.01); *H04L 63/1466* (2013.01); *G06F 2009/45587* (2013.01); *G06F 2009/45595* (2013.01)

(58) Field of Classification Search
None
See application file for complete search history.

(56) References Cited

U.S. PATENT DOCUMENTS

| 6,898,632 B2 | 5/2005 | Gordy et al. |
| 6,941,348 B2 | 9/2005 | Petry et al. |

(Continued)

FOREIGN PATENT DOCUMENTS

| GB | 2439806 A | 1/2008 |
| GB | 2490431 A | 10/2012 |

(Continued)

OTHER PUBLICATIONS

Venezia, Paul, "NetDetector Captures Intrusions", InfoWorld Issue 27, ("Venezia"), (Jul. 14, 2003).

(Continued)

*Primary Examiner* — Beemnet W Dada
*Assistant Examiner* — Hassan Saadoun
(74) *Attorney, Agent, or Firm* — Rutan & Tucker, LLP

(57) ABSTRACT

An electronic device for detecting threats within a server including a processor, and a memory communicatively coupled to the processor. The memory includes an inspection logic to receive a suspicious object for threat evaluation, and an analyzer logic including at least a first analyzer. The first analyzer, when processed by the processor, generates a virtual environment including a virtual client and a virtual server in communication over a virtualized communication link. The memory also includes a detonator logic configured to trigger the suspicious object. The analyzer logic loads and initializes the suspicious object into the virtual environment and further generates a first score based upon the triggering by the detonator logic that is indicative of a threat posed by the suspicious object. The memory may also include a reporting logic that compares a threat score to at least one threshold and in response may generate at least one remedial action.

18 Claims, 5 Drawing Sheets

(56) References Cited

U.S. PATENT DOCUMENTS

| | | |
|---|---|---|
| 7,080,407 B1 | 7/2006 | Zhao et al. |
| 7,080,408 B1 | 7/2006 | Pak et al. |
| 7,243,371 B1 | 7/2007 | Kasper et al. |
| 7,308,716 B2 | 12/2007 | Danford et al. |
| 7,448,084 B1 | 11/2008 | Apap et al. |
| 7,458,098 B2 | 11/2008 | Judge et al. |
| 7,467,408 B1 | 12/2008 | O'Toole, Jr. |
| 7,496,961 B2 | 2/2009 | Zimmer et al. |
| 7,519,990 B1 | 4/2009 | Xie |
| 7,540,025 B2 | 5/2009 | Tzadikario |
| 7,639,714 B2 | 12/2009 | Stolfo et al. |
| 7,698,548 B2 | 4/2010 | Shelest et al. |
| 7,779,463 B2 | 8/2010 | Stolfo et al. |
| 7,854,007 B2 | 12/2010 | Sprosts et al. |
| 7,937,387 B2 | 5/2011 | Frazier et al. |
| 7,949,849 B2 | 5/2011 | Lowe et al. |
| 8,006,305 B2 | 8/2011 | Aziz |
| 8,020,206 B2 | 9/2011 | Hubbard et al. |
| 8,045,458 B2 | 10/2011 | Alperovitch et al. |
| 8,069,484 B2 | 11/2011 | McMillan et al. |
| 8,171,553 B2 | 5/2012 | Aziz et al. |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,291,499 B2 | 10/2012 | Aziz et al. |
| 8,370,938 B1 | 2/2013 | Daswani et al. |
| 8,370,939 B2 | 2/2013 | Zaitsev et al. |
| 8,375,444 B2 | 2/2013 | Viz et al. |
| 8,438,644 B2 | 5/2013 | Watters et al. |
| 8,464,340 B2 | 6/2013 | Ahn et al. |
| 8,494,974 B2 | 7/2013 | Watters et al. |
| 8,516,593 B2 | 8/2013 | Aziz |
| 8,528,086 B1 | 9/2013 | Aziz |
| 8,539,582 B1 | 9/2013 | Aziz et al. |
| 8,549,638 B2 | 10/2013 | Aziz |
| 8,561,177 B1 | 10/2013 | Aziz et al. |
| 8,566,476 B2 | 10/2013 | Shiffer et al. |
| 8,566,946 B1 | 10/2013 | Aziz et al. |
| 8,584,239 B2 | 11/2013 | Aziz et al. |
| 8,635,696 B1 | 1/2014 | Aziz |
| 8,689,333 B2 | 4/2014 | Aziz |
| 8,713,681 B2 | 4/2014 | Silberman et al. |
| 8,776,229 B1 | 7/2014 | Aziz |
| 8,793,278 B2 | 7/2014 | Frazier et al. |
| 8,793,787 B2 | 7/2014 | Ismael et al. |
| 8,813,050 B2 | 8/2014 | Watters et al. |
| 8,832,829 B2 | 9/2014 | Manni et al. |
| 8,850,571 B2 | 9/2014 | Staniford et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,935,779 B2 | 1/2015 | Manni et al. |
| 8,949,257 B2 | 2/2015 | Shiffer et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,015,846 B2 | 4/2015 | Watters et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,495,180 B2 | 11/2016 | Ismael |
| 9,497,213 B2 | 11/2016 | Thompson et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shiffer et al. |
| 9,690,936 B1 | 6/2017 | Malik et al. |
| 9,736,179 B2 | 8/2017 | Ismael |
| 9,740,857 B2 | 8/2017 | Ismael et al. |
| 9,747,446 B1 | 8/2017 | Pidathala et al. |
| 9,749,343 B2 | 8/2017 | Watters et al. |
| 9,749,344 B2 | 8/2017 | Watters et al. |
| 9,756,074 B2 * | 9/2017 | Aziz .................... G06F 21/564 |
| 9,773,112 B1 | 9/2017 | Rathor et al. |
| 9,781,144 B1 | 10/2017 | Otvagin et al. |
| 9,787,700 B1 | 10/2017 | Amin et al. |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |

(56) References Cited

U.S. PATENT DOCUMENTS

| | | |
|---|---|---|
| 9,888,019 B1 | 2/2018 | Pidathala et al. |
| 9,892,261 B2 | 2/2018 | Joram et al. |
| 9,904,955 B2 | 2/2018 | Watters et al. |
| 9,910,988 B1 | 3/2018 | Vincent et al. |
| 9,912,644 B2 | 3/2018 | Cunningham |
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |
| 9,934,381 B1 | 4/2018 | Kindlund et al. |
| 9,946,568 B1 | 4/2018 | Ismael et al. |
| 9,954,890 B1 | 4/2018 | Staniford et al. |
| 9,973,531 B1 | 5/2018 | Thioux |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,063,583 B2 | 8/2018 | Watters et al. |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 10,282,548 B1 | 5/2019 | Aziz et al. |
| 10,284,574 B1 | 5/2019 | Aziz et al. |
| 10,284,575 B2 | 5/2019 | Paithane et al. |
| 10,296,437 B2 | 5/2019 | Ismael et al. |
| 10,335,738 B1 | 7/2019 | Paithane et al. |
| 10,341,363 B1 | 7/2019 | Vincent et al. |
| 10,341,365 B1 | 7/2019 | Ha |
| 10,366,231 B1 | 7/2019 | Singh et al. |
| 10,380,343 B1 | 8/2019 | Jung et al. |
| 10,395,029 B1 | 8/2019 | Steinberg |
| 10,404,725 B1 | 9/2019 | Rivlin et al. |
| 10,417,031 B2 | 9/2019 | Paithane et al. |
| 10,430,586 B1 | 10/2019 | Paithane et al. |
| 10,432,649 B1 | 10/2019 | Bennett et al. |
| 10,445,502 B1 * | 10/2019 | Desphande .......... G06F 21/554 |
| 10,447,728 B1 | 10/2019 | Steinberg |
| 10,454,950 B1 | 10/2019 | Aziz |
| 10,454,953 B1 | 10/2019 | Amin et al. |
| 10,462,173 B1 | 10/2019 | Aziz et al. |
| 10,467,411 B1 | 11/2019 | Pidathala et al. |
| 10,467,414 B1 | 11/2019 | Kindlund et al. |
| 10,469,512 B1 | 11/2019 | Ismael |
| 10,474,813 B1 | 11/2019 | Ismael |
| 10,476,906 B1 | 11/2019 | Siddiqui |
| 10,476,909 B1 | 11/2019 | Aziz et al. |
| 10,491,627 B1 | 11/2019 | Su |
| 10,503,904 B1 | 12/2019 | Singh et al. |
| 10,505,956 B1 | 12/2019 | Pidathala et al. |
| 10,511,614 B1 | 12/2019 | Aziz |
| 10,515,214 B1 | 12/2019 | Vincent et al. |
| 10,523,609 B1 | 12/2019 | Subramanian |
| 10,528,726 B1 | 1/2020 | Ismael |
| 10,534,906 B1 | 1/2020 | Paithane et al. |
| 10,552,610 B1 | 2/2020 | Vashisht et al. |
| 10,554,507 B1 | 2/2020 | Siddiqui et al. |
| 10,565,378 B1 | 2/2020 | Vincent et al. |
| 10,567,405 B1 | 2/2020 | Aziz |
| 10,572,665 B2 | 2/2020 | Jung et al. |
| 10,581,874 B1 | 3/2020 | Khalid et al. |
| 10,581,879 B1 | 3/2020 | Paithane et al. |
| 10,581,898 B1 | 3/2020 | Singh |
| 10,587,636 B1 | 3/2020 | Aziz et al. |
| 10,587,647 B1 | 3/2020 | Khalid et al. |
| 10,592,678 B1 | 3/2020 | Ismael et al. |
| 10,601,848 B1 | 3/2020 | Jeyaraman et al. |
| 10,601,863 B1 | 3/2020 | Siddiqui |
| 10,601,865 B1 | 3/2020 | Mesdaq et al. |
| 10,616,266 B1 | 4/2020 | Otvagin |
| 10,621,338 B1 | 4/2020 | Pfoh et al. |
| 10,623,434 B1 | 4/2020 | Aziz et al. |
| 10,637,880 B1 | 4/2020 | Islam et al. |
| 10,642,753 B1 | 5/2020 | Steinberg |
| 10,657,251 B1 | 5/2020 | Malik et al. |
| 10,666,686 B1 | 5/2020 | Singh et al. |
| 10,671,721 B1 | 6/2020 | Otvagin et al. |
| 10,671,726 B1 | 6/2020 | Paithane et al. |
| 10,701,091 B1 | 6/2020 | Cunningham et al. |
| 10,706,149 B1 | 7/2020 | Vincent |
| 10,713,358 B2 | 7/2020 | Sikorski et al. |
| 10,713,362 B1 | 7/2020 | Vincent et al. |
| 10,715,542 B1 | 7/2020 | Wei et al. |
| 10,726,127 B1 | 7/2020 | Steinberg |
| 10,728,263 B1 | 7/2020 | Neumann |
| 10,735,458 B1 | 8/2020 | Haq et al. |
| 10,740,456 B1 | 8/2020 | Ismael et al. |
| 10,747,872 B1 | 8/2020 | Ha et al. |
| 10,757,120 B1 | 8/2020 | Aziz et al. |
| 10,757,134 B1 | 8/2020 | Eyada |
| 10,785,255 B1 | 9/2020 | Otvagin et al. |
| 10,791,138 B1 | 9/2020 | Siddiqui et al. |
| 10,795,991 B1 | 10/2020 | Ross et al. |
| 10,798,112 B2 | 10/2020 | Siddiqui et al. |
| 10,798,121 B1 | 10/2020 | Khalid et al. |
| 10,805,340 B1 | 10/2020 | Goradia |
| 10,805,346 B2 | 10/2020 | Kumar et al. |
| 10,812,513 B1 | 10/2020 | Manni et al. |
| 10,817,606 B1 | 10/2020 | Vincent |
| 10,826,931 B1 | 11/2020 | Quan et al. |
| 10,826,933 B1 | 11/2020 | Ismael et al. |
| 10,834,107 B1 | 11/2020 | Paithane et al. |
| 10,846,117 B1 | 11/2020 | Steinberg |
| 10,848,397 B1 | 11/2020 | Siddiqui et al. |
| 10,848,521 B1 | 11/2020 | Thioux et al. |
| 10,855,700 B1 | 12/2020 | Jeyaraman et al. |
| 10,868,818 B1 | 12/2020 | Rathor et al. |
| 10,872,151 B1 | 12/2020 | Kumar et al. |
| 10,873,597 B1 | 12/2020 | Mehra et al. |
| 10,887,328 B1 | 1/2021 | Paithane et al. |
| 10,893,059 B1 | 1/2021 | Aziz et al. |
| 10,893,068 B1 | 1/2021 | Khalid et al. |
| 10,902,117 B1 | 1/2021 | Singh et al. |
| 10,902,119 B1 | 1/2021 | Vashisht et al. |
| 10,904,286 B1 | 1/2021 | Liu |
| 10,929,266 B1 | 2/2021 | Goradia et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0169952 A1 | 11/2002 | DiSanto et al. |

(56) References Cited

U.S. PATENT DOCUMENTS

| | | |
|---|---|---|
| 2002/0184528 A1 | 12/2002 | Shevenell et al. |
| 2002/0188887 A1 | 12/2002 | Largman et al. |
| 2003/0084318 A1 | 5/2003 | Schertz |
| 2003/0188190 A1 | 10/2003 | Aaron et al. |
| 2003/0191957 A1 | 10/2003 | Hypponen et al. |
| 2004/0015712 A1 | 1/2004 | Szor |
| 2004/0019832 A1 | 1/2004 | Arnold et al. |
| 2004/0117478 A1 | 6/2004 | Triulzi et al. |
| 2004/0117624 A1 | 6/2004 | Brandt et al. |
| 2004/0236963 A1 | 11/2004 | Danford et al. |
| 2004/0255161 A1 | 12/2004 | Cavanaugh |
| 2004/0268147 A1 | 12/2004 | Wiederin et al. |
| 2005/0021740 A1 | 1/2005 | Bar et al. |
| 2005/0086523 A1 | 4/2005 | Zimmer et al. |
| 2005/0091513 A1 | 4/2005 | Mitomo et al. |
| 2005/0108562 A1 | 5/2005 | Khazan et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0238005 A1 | 10/2005 | Chen et al. |
| 2005/0262562 A1 | 11/2005 | Gassoway |
| 2005/0283839 A1 | 12/2005 | Cowburn |
| 2006/0010495 A1 | 1/2006 | Cohen et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0031476 A1 | 2/2006 | Mathes et al. |
| 2006/0070130 A1 | 3/2006 | Costea et al. |
| 2006/0117385 A1 | 6/2006 | Mester et al. |
| 2006/0123477 A1 | 6/2006 | Raghavan et al. |
| 2006/0150249 A1 | 7/2006 | Gassen et al. |
| 2006/0161987 A1 | 7/2006 | Levy-Yurista |
| 2006/0173992 A1 | 8/2006 | Weber et al. |
| 2006/0191010 A1 | 8/2006 | Benjamin |
| 2006/0242709 A1 | 10/2006 | Seinfeld et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0064689 A1 | 3/2007 | Shin et al. |
| 2007/0143827 A1 | 6/2007 | Nicodemus et al. |
| 2007/0157306 A1 | 7/2007 | Elrod et al. |
| 2007/0192858 A1 | 8/2007 | Lum |
| 2007/0208822 A1 | 9/2007 | Wang et al. |
| 2007/0240218 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2008/0005782 A1 | 1/2008 | Aziz |
| 2008/0040710 A1 | 2/2008 | Chiriac |
| 2008/0072326 A1 | 3/2008 | Danford et al. |
| 2008/0077793 A1 | 3/2008 | Tan et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0189787 A1 | 8/2008 | Arnold et al. |
| 2008/0307524 A1 | 12/2008 | Singh et al. |
| 2008/0320594 A1 | 12/2008 | Jiang |
| 2009/0003317 A1 | 1/2009 | Kasralikar et al. |
| 2009/0064332 A1 | 3/2009 | Porras et al. |
| 2009/0083855 A1 | 3/2009 | Apap et al. |
| 2009/0125976 A1 | 5/2009 | Wassermann et al. |
| 2009/0126015 A1 | 5/2009 | Monastyrsky et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0241190 A1 | 9/2009 | Todd et al. |
| 2009/0300589 A1 | 12/2009 | Watters et al. |
| 2010/0017546 A1 | 1/2010 | Poo et al. |
| 2010/0030996 A1 | 2/2010 | Butler, II |
| 2010/0058474 A1 | 3/2010 | Hicks |
| 2010/0077481 A1 | 3/2010 | Polyakov et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0192223 A1 | 7/2010 | Ismael et al. |
| 2010/0281542 A1 | 11/2010 | Stolfo et al. |
| 2011/0078794 A1 | 3/2011 | Manni et al. |
| 2011/0093951 A1 | 4/2011 | Aziz |
| 2011/0099633 A1 | 4/2011 | Aziz |
| 2011/0099635 A1 | 4/2011 | Silberman et al. |
| 2011/0167493 A1 | 7/2011 | Song et al. |
| 2011/0173213 A1 | 7/2011 | Frazier et al. |
| 2011/0178942 A1 | 7/2011 | Watters et al. |
| 2011/0219450 A1 | 9/2011 | McDougal et al. |
| 2011/0225624 A1 | 9/2011 | Sawhney et al. |
| 2011/0247072 A1 | 10/2011 | Staniford et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0117652 A1 | 5/2012 | Manni et al. |
| 2012/0174186 A1 | 7/2012 | Aziz et al. |
| 2012/0174218 A1 | 7/2012 | McCoy et al. |
| 2012/0210423 A1 | 8/2012 | Friedrichs et al. |
| 2012/0222121 A1 | 8/2012 | Staniford et al. |
| 2012/0233698 A1 | 9/2012 | Watters et al. |
| 2012/0278886 A1 | 11/2012 | Luna |
| 2012/0331553 A1 | 12/2012 | Aziz et al. |
| 2013/0036472 A1 | 2/2013 | Aziz |
| 2013/0047257 A1 | 2/2013 | Aziz |
| 2013/0097706 A1 | 4/2013 | Titonis et al. |
| 2013/0185795 A1 | 7/2013 | Winn et al. |
| 2013/0227691 A1 | 8/2013 | Aziz et al. |
| 2013/0232577 A1 | 9/2013 | Watters et al. |
| 2013/0247186 A1 | 9/2013 | LeMasters |
| 2013/0282426 A1 | 10/2013 | Watters et al. |
| 2013/0291109 A1 | 10/2013 | Staniford et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0032875 A1 | 1/2014 | Butler |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0297494 A1 | 10/2014 | Watters et al. |
| 2014/0337836 A1* | 11/2014 | Ismael ............. H04L 63/145 718/1 |
| 2014/0344926 A1 | 11/2014 | Cunningham et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0180886 A1 | 6/2015 | Staniford et al. |
| 2015/0186645 A1 | 7/2015 | Aziz et al. |
| 2015/0199513 A1 | 7/2015 | Ismael et al. |
| 2015/0199531 A1 | 7/2015 | Ismael et al. |
| 2015/0199532 A1 | 7/2015 | Ismael et al. |
| 2015/0220735 A1 | 8/2015 | Paithane et al. |
| 2015/0372980 A1 | 12/2015 | Eyada |
| 2016/0004869 A1 | 1/2016 | Ismael et al. |
| 2016/0006756 A1 | 1/2016 | Ismael et al. |
| 2016/0044000 A1 | 2/2016 | Cunningham |
| 2016/0127393 A1 | 5/2016 | Aziz et al. |
| 2016/0191547 A1 | 6/2016 | Zafar et al. |
| 2016/0191550 A1 | 6/2016 | Ismael et al. |
| 2016/0241580 A1 | 8/2016 | Watters et al. |

(56) References Cited

U.S. PATENT DOCUMENTS

| | | |
|---|---|---|
| 2016/0241581 A1 | 8/2016 | Watters et al. |
| 2016/0261612 A1 | 9/2016 | Mesdaq et al. |
| 2016/0285914 A1 | 9/2016 | Singh et al. |
| 2016/0301703 A1 | 10/2016 | Aziz |
| 2016/0323295 A1 | 11/2016 | Joram et al. |
| 2016/0335110 A1 | 11/2016 | Paithane et al. |
| 2017/0083703 A1 | 3/2017 | Abbasi et al. |
| 2018/0013770 A1 | 1/2018 | Ismael |
| 2018/0048660 A1 | 2/2018 | Paithane et al. |
| 2018/0069891 A1 | 3/2018 | Watters et al. |
| 2018/0097787 A1* | 4/2018 | Murthy .................. H04L 63/08 |
| 2018/0097788 A1* | 4/2018 | Murthy ................ H04L 63/102 |
| 2018/0097789 A1* | 4/2018 | Murthy .............. H04L 63/0227 |
| 2018/0121316 A1 | 5/2018 | Ismael et al. |
| 2018/0288077 A1 | 10/2018 | Siddiqui et al. |
| 2019/0104154 A1 | 4/2019 | Kumar et al. |
| 2019/0132334 A1 | 5/2019 | Johns et al. |
| 2019/0207966 A1 | 7/2019 | Vashisht et al. |
| 2019/0207967 A1 | 7/2019 | Vashisht et al. |
| 2020/0252428 A1 | 8/2020 | Gardezi et al. |

FOREIGN PATENT DOCUMENTS

| | | |
|---|---|---|
| WO | 0206928 A2 | 1/2002 |
| WO | 02/23805 A2 | 3/2002 |
| WO | 2007117636 A2 | 10/2007 |
| WO | 2008/041950 A2 | 4/2008 |
| WO | 2011/084431 A2 | 7/2011 |
| WO | 2011/112348 A1 | 9/2011 |
| WO | 2012/075336 A1 | 6/2012 |
| WO | 2012/145066 A1 | 10/2012 |
| WO | 2013/067505 A1 | 5/2013 |

OTHER PUBLICATIONS

Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).

Wahid et al., Characterising the Evolution in Scanning Activity of Suspicious Hosts, Oct. 2009, Third International Conference on Network and System Security, pp. 344-350.

Whyte, et al., "DNS-Based Detection of Scanning Works in an Enterprise Network", Proceedings of the 12th Annual Network and Distributed System Security Symposium, (Feb. 2005), 15 pages.

Williamson, Matthew M., "Throttling Viruses: Restricting Propagation to Defeat Malicious Mobile Code", ACSAC Conference, Las Vegas, NV, USA, (Dec. 2002), pp. 1-9.

Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.

Zhang et al., The Effects of Threading, Infection Time, and Multiple-Attacker Collaboration on Malware Propagation, Sep. 2009, IEEE 28th International Symposium on Reliable Distributed Systems, pp. 73-82.

"Mining Specification of Malicious Behavior"—Jha et al, UCSB, Sep. 2007 https://www.cs.ucsb.edu/.about.chris/research/doc/esec07.sub.-mining.pdf-.

"Network Security: NetDetector—Network Intrusion Forensic System (NIFS) Whitepaper", ("NetDetector Whitepaper"), (2003).

"When Virtual is Better Than Real", IEEEXplore Digital Library, available at, http://ieeexplore.ieee.org/xpl/articleDetails.isp?reload=true&arnumbe- r=990073, (Dec. 7, 2013).

Abdullah, et al., Visualizing Network Data for Intrusion Detection, 2005 IEEE Workshop on Information Assurance and Security, pp. 100-108.

Adetoye, Adedayo , et al., "Network Intrusion Detection & Response System", ("Adetoye"), (Sep. 2003).

Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.

Aura, Tuomas, "Scanning electronic documents for personally identifiable information", Proceedings of the 5th ACM workshop on Privacy in electronic society. ACM, 2006.

Baecher, "The Nepenthes Platform: An Efficient Approach to collect Malware", Springer-verlag Berlin Heidelberg, (2006), pp. 165-184.

Bayer, et al., "Dynamic Analysis of Malicious Code", J Comput Virol, Springer-Verlag, France., (2006), pp. 67-77.

Boubalos, Chris , "extracting syslog data out of raw pcap dumps, seclists.org, Honeypots mailing list archives", available at http://seclists.org/honeypots/2003/q2/319 ("Boubalos"), (Jun. 5, 2003).

Chaudet, C. , et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.

Chen, P. M. and Noble, B. D., "When Virtual is Better Than Real, Department of Electrical Engineering and Computer Science", University of Michigan ("Chen") (2001).

Cisco "Intrusion Prevention for the Cisco ASA 5500-x Series" Data Sheet (2012).

Dohen, M.I. , "PyFlag—An advanced network forensic framework", Digital investigation 5, Elsevier, (2008), pp. S112-S120.

Dosta, M. , et al., "Vigilante: End-to-End Containment of Internet Worms", SOSP '05, Association for Computing Machinery, Inc., Brighton U.K., (Oct. 23-26, 2005).

Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, SSN: 1540-7993, DOI: 10.1109/MSP.2011.14.

Distler, "Malware Analysis: An Introduction", SANS Institute InfoSec Reading Room, SANS Institute, (2007).

Dunlap, George W. , et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).

FireEye Malware Analysis & Exchange Network, Malware Protection System, FireEye Inc., 2010.

FireEye Malware Analysis, Modern Malware Forensics, FireEye Inc., 2010.

FireEye v.6.0 Security Target, pp. 1-35, Version 1.1, FireEye Inc., May 2011.

Goel, et al., Reconstructing System State for Intrusion Analysis, Apr. 2008 SIGOPS Operating Systems Review, vol. 42 Issue 3, pp. 21-28.

Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-id/1035069? [retrieved on Jun. 1, 2016].

Heng Yin et al, Panorama: Capturing System-Wide Information Flow for Malware Detection and Analysis, Research Showcase @ CMU, Carnegie Mellon University, 2007.

Hiroshi Shinotsuka, Malware Authors Using New Techniques to Evade Automated Threat Analysis Systems, Oct. 26, 2012, http://www.symantec.com/connect/blogs/, pp. 1-4.

Idika et al., A-Survey-of-Malware-Detection-Techniques, Feb. 2, 2007, Department of Computer Science, Purdue University.

Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.

Kaeo, Merike , "Designing Network Security", ("Kaeo"), (Nov. 2003).

Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.

(56) References Cited

OTHER PUBLICATIONS

Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).
Kim, H., et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King"), (2003).
Kreibich, C., et al., "Honeycomb-Creating Intrusion Detection Signatures Using Honeypots", 2nd Workshop on Hot Topics in Networks (HotNets-11), Boston, USA, (2003).
Kristoff, J., "Botnets, Detection and Mitigation: DNS-Based Techniques", NU Security Day, (2005), 23 pages.
Lastline Labs, The Threat of Evasive Malware, Feb. 25, 2013, Lastline Labs, pp. 1-8.
Li et al., A VMM-Based System Call Interposition Framework for Program Monitoring, Dec. 2010, IEEE 16th International Conference on Parallel and Distributed Systems, pp. 706-711.
Lindorfer, Martina, Clemens Kolbitsch, and Paolo Milani Comparetti. "Detecting environment-sensitive malware." Recent Advances in Intrusion Detection. Springer Berlin Heidelberg, 2011.
Marchette, David J., "Computer Intrusion Detection and Network Monitoring: A Statistical Viewpoint", ("Marchette"), (2001).
Moore, D., et al., "Internet Quarantine: Requirements for Containing Self-Propagating Code", INFOCOM, vol. 3, (Mar. 30-Apr. 3, 2003), pp. 1901-1910.
Morales, Jose A., et al., ""Analyzing and exploiting network behaviors of malware."", Security and Privacy in Communication Networks. Springer Berlin Heidelberg, 2010. 20-34.
Mori, Detecting Unknown Computer Viruses, 2004, Springer-Verlag Berlin Heidelberg.
Natvig, Kurt, "SANDBOXII: Internet", Virus Bulletin Conference, ("Natvig"), (Sep. 2002).
NetBIOS Working Group. Protocol Standard fora NetBIOS Service on a TCP/UDP transport: Concepts and Methods. STD 19, RFC 1001, Mar. 1987.
Newsome, J., et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).
Nojiri, D., et al., "Cooperation Response Strategies for Large Scale Attack Mitigation", DARPA Information Survivability Conference and Exposition, vol. 1, (Apr. 22-24, 2003), pp. 293-302.
Oberheide et al., CloudAV.sub.-N-Version Antivirus in the Network Cloud, 17th USENIX Security Symposium USENIX Security '08 Jul. 28-Aug. 1, 2008 San Jose, CA.
Reiner Sailer, Enriquillo Valdez, Trent Jaeger, Roonald Perez, Leendertvan Doorn, John Linwood Griffin, Stefan Berger., sHype: Secure Hypervisor Appraoch to Trusted Virtualized Systems (Feb. 2, 2005) ("Sailer").
Silicon Defense, "Worm Containment in the Internal Network", (Mar. 2003), pp. 1-25.
Singh, S., et al., "Automated Worm Fingerprinting", Proceedings of the ACM/USENIX Symposium on Operating System Design and Implementation, San Francisco, California, (Dec. 2004).
Thomas H. Ptacek, and Timothy N. Newsham, "Insertion, Evasion, and Denial of Service: Eluding Network Intrusion Detection", Secure Networks, ("Ptacek"), (Jan. 1998).

\* cited by examiner

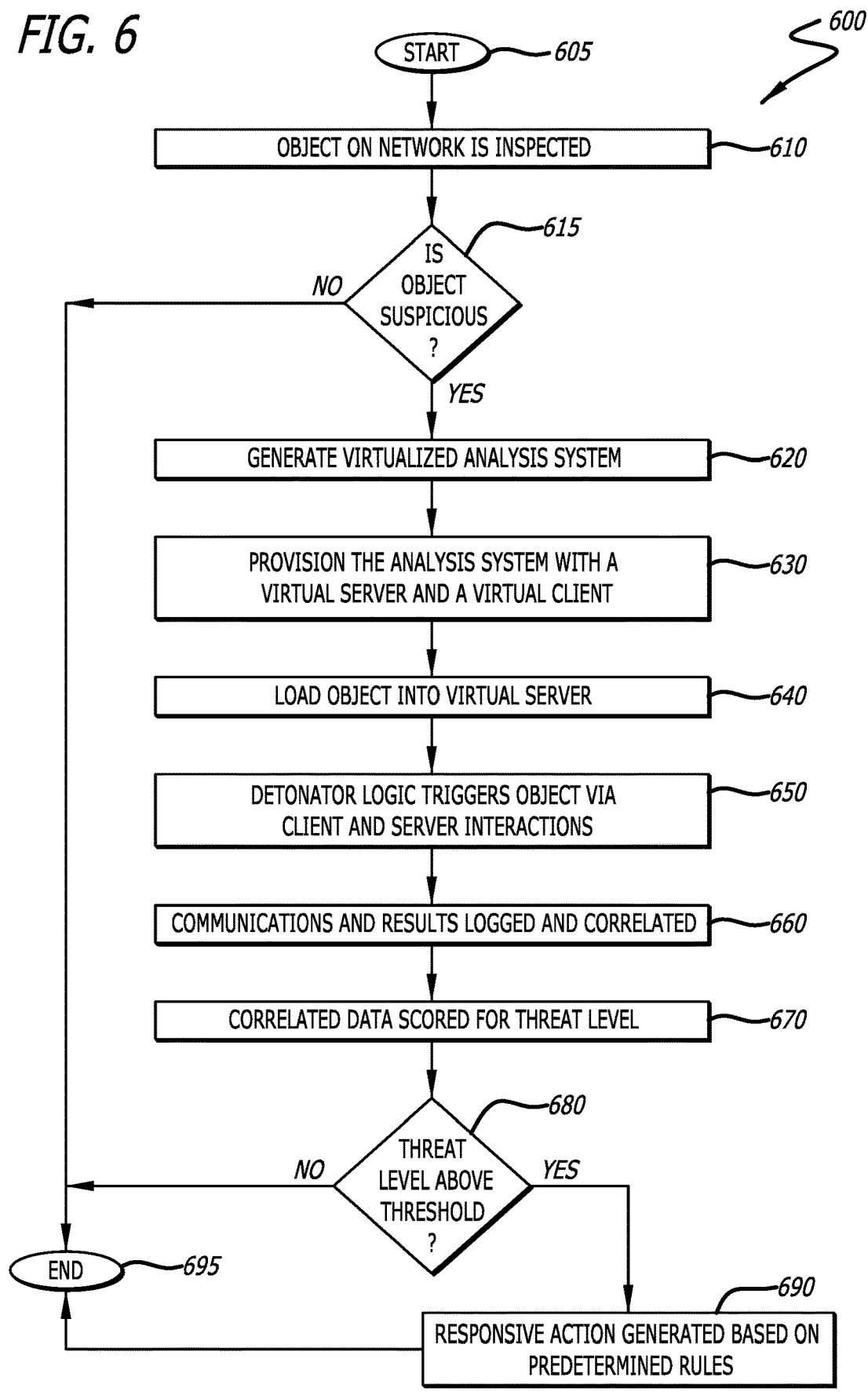

US 11,677,786 B1

SYSTEM AND METHOD FOR DETECTING AND PROTECTING AGAINST CYBERSECURITY ATTACKS ON SERVERS

CROSS REFERENCE TO RELATED APPLICATIONS

This application is based upon and claims the benefit of priority from U.S. Provisional Patent Application No. 62/826,875 filed Mar. 29, 2019, the entire contents of which are incorporated herein by reference.

FIELD

Embodiments of the disclosure relate to the field of cybersecurity. More specifically, certain embodiments of the disclosure relates to a system, apparatus and method for protecting servers against specific cybersecurity attacks.

BACKGROUND

Over the last decade, malicious software (malware) has become a pervasive problem for Internet users and system administrators of network servers. Such malware may come in the form of web shell attacks that can compromise servers on a network. Normally, a web shell attack is perpetuated through a script written in a popular scripting language supported by a server, such as a web server connected to a targeted enterprise network. More specifically, in many cases, scripts associated with a web shell attack (hereinafter, "web shell script") are written in a popular scripting languages known to be supported by a majority of web servers. Examples of popular scripting language that tend to be utilized by web shell scripts may include, but are not limited or restricted to PHP Hypertext Preprocessor ("PHP"), Python, Ruby, Perl, Active Server Pages ("ASP"), Java Server Pages ("JSP") or Unix Shell Script.

In conducting a web shell attack, the web shell script may be loaded into the web server unnoticed, given that the web shell script could be uploaded in a dormant state as part of incoming Hypertext Transfer Protocol (HTTP) traffic. However, upon activation, the web shell script may enable a remote network device, operating as a client device, to gain acess to stored content within the web server and/or gain administrative control of the web server. This may allow the web shell script to illicitly extract content stored within the web server or stored within another network device connected to a private network that are accessible via the web server.

In almost all cases, the web shell attacks are challenging to detect and eliminate with conventional techniques because web shell scripts may remain dormant for a prolonged period of time and no additional software is necessary to commence a web shell attack. The web shell script may become active in response to a triggering event such as received commands from a remote network device utilized by a cybersecurity threat actor conducting a web shell attack. Once the web shell script becomes active and communications are established with the remote network device, the cybersecurity threat actor may add a new login account, which allows the threat actor to access this compromised web server in the future without the need to upload any new file or script or conduct a secondary web shell attack.

Also, web shell attacks can be challenging to detect because they may involve the creation of a backdoor into the server, where the backdoor may allow the threat actor to remotely access and gain administrative control of the compromised server at any time in the future without further re-uploading or exchanging content via HTTP traffic. Such administrative control may allow the threat actor to gain escalated privileges, compromising the web server and its contents, and obfuscate his or her activity as he or she attempts to gain access to another server within a network by laterally infecting that server with the web shell script. Additionally, the threat actor may take steps to cover his or her tracks by closing an exploited vulnerability within the server to prevent others from compromising that server or to take steps to avoid detection.

In summary, various types of conventional cybersecurity systems have been deployed in an attempt to detect malware, including detecting malicious files or other network content uploaded into a server during a web shell attack. In some cases, these conventional cybersecurity systems evaluated suspicious objects (e.g., content including a script and/or executable code suspected of being malicious) and made a determination whether the object may be construed as a cybersecurity threat or not (i.e. benign).

BRIEF DESCRIPTION OF THE DRAWINGS

Embodiments of the invention are illustrated by way of example and not by way of limitation in the figures of the accompanying drawings, in which like references indicate similar elements and in which:

FIG. 6 is an exemplary flowchart of the process of detecting cyberattacks on servers utilizing a virtualized analysis system of FIG. 4 or FIG. 5.

DETAILED DESCRIPTION

Figure 1:
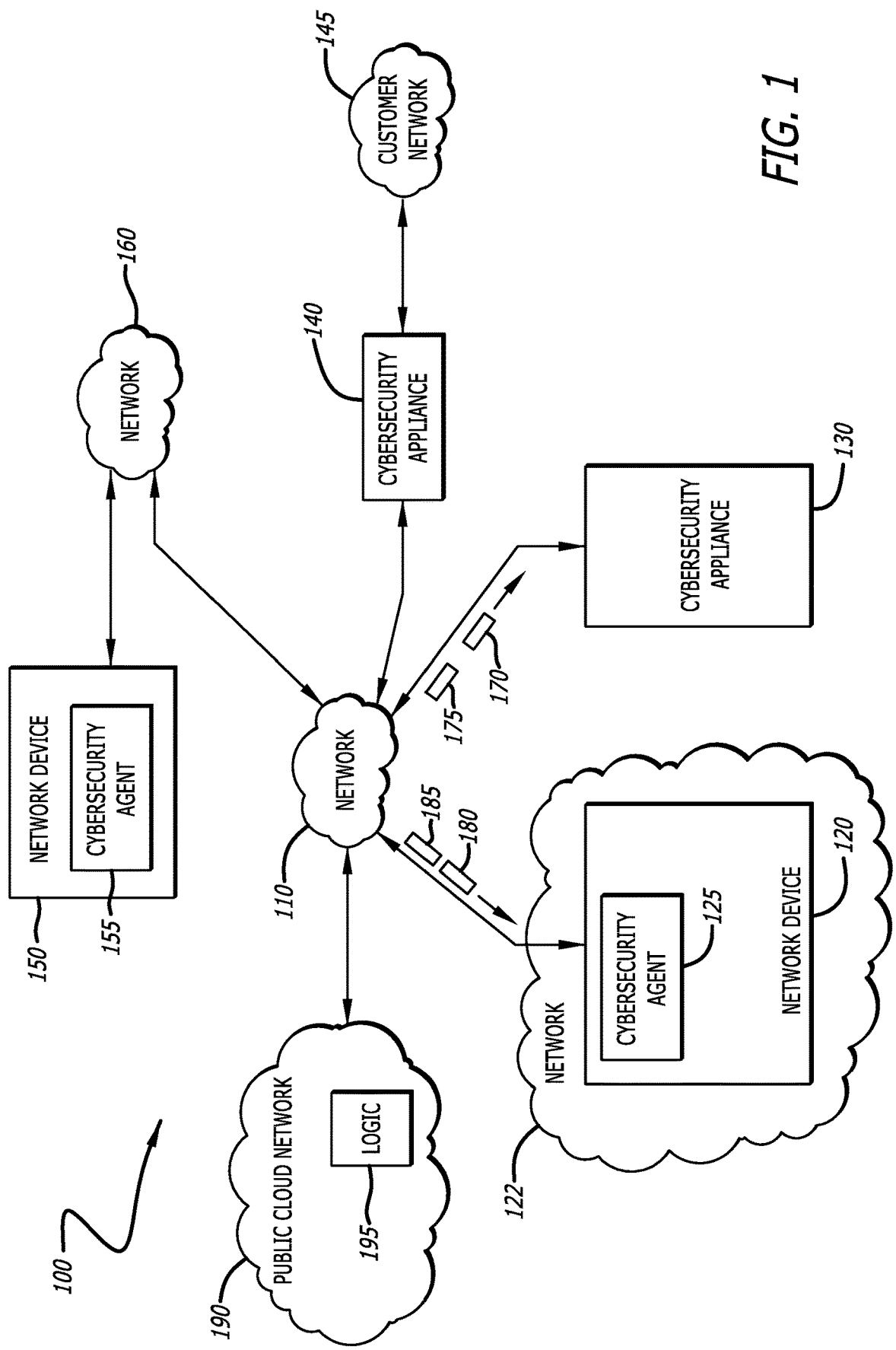
FIG. 1 depicts an exemplary system diagram of a communication network including one or more cybersecurity appliances and cybersecurity agents with virtualized analysis systems to detect a cybersecurity threat such as a web shell attack.

Various embodiments of the disclosure relate to a cybersecurity system and/or process configured with a virtualized analysis system to detect and protect against cybersecurity threats (e.g., a cyberattack) on servers, including web shell attacks. Unlike conventional cybersecurity schemes, the cybersecurity system provides a virtualized platform to conduct hoslistic analytics on potential web shell script, including the bilateral communications between a virtual server and virtual client representative of a phsyical server and a client device. Herein, the virtualized analysis system includes a virtual server and a virtual client. A "virtual server" corresponds to a software representation of a physical server (e.g., processor, network interfaces, etc.) that may share physical hardware and software resources with other virtual servers. A "virtual client" corresponds to a software representation of physical resources associated with a client device (endpoint), such as a portable or stationary computer or smartphone for example, which is configured to communicate with the virtual server.

According to one embodiment of the disclosure, the cybersecurity system may include a first embodiment of the virtualized analysis system, which features a single (virtual) analyzer including both a virtual server and a virtual client. Monitoring logic is instantiated as part of the analyzer to monitor operability of the virtual server and the virtual client as well as the communications between the virtual server and the virtual client. For this analyzer, the virtual server may be provisioned in accordance with a software profile that supports processing of the suspicious object loaded into the virtual server, such as a web shell script for example, as well as communications with the virtual client. As an illustrative example, the virtual server may be provisioned to include one or more scripting engines (e.g., logic that alters script into executable code) that would effectuate processing of a web shell script. Similarly, the virtual client may be provisioned in accordance with a software profile with script applications, libraries, software development kits, etc.) to support communications with the virtual server.

More specifically, configured to detect web shell attacks or other types of cybersecurity threats, the cybersecurity system may be deployed as a cybersecurity agent or a cybersecurity appliance. According to one embodiment of the disclosure, the cybersecurity agent corresponds to software installed within a network device (e.g., server), operating in the foreground or background, that receives and analyzes objects to determine whether such objects are part of a cybersecurity threat (e.g., web shell attack). In particular, the cybersecurity agent may be configured to at least (i) receive, as input, an object (defined below) for analysis and meta-information associated with that object, and (ii) determine whether the object is "suspicious". The term "suspicious" indicates that a corresponding object cannot be definitively determined to be benign or malicious.

For this embodiment of the disclosure, the cybersecurity agent may be configured to collect content and meta-information associated with the object and conduct a rule-based inspection to determine whether the received object is suspicious. As an illustrative example, logic within the cybersecurity agent may inspect, in accordance with one or more detection rules, content of the object and/or meta-information associated with the object to determine whether the object is a script or a particular script type. One of the detection rules may be directed to inspecting an extension associated with the object to determine whether the extension identifies the object as a known script. For instance, an object with a ".php" extention may be identified as a particular script, namely a PHP file to generate dynamic web pages with code that enables web pages to gather details entered by viewers as well as process and store that data for later retrieval (hereinafter, "PHP file"). As PHP files (and scripts in general) are widely used to initiate a web shell attack, the object would be deemed "suspicious" based on a single characteristic that the object is a script. Of course, various characteristics of the object, solely or in combination, may cause the object to be identified as "suspicious," resulting in the object undergoing further analyses by an analyzer.

Besides suspicious object detection, the cybersecurity agent may be further configured to (iii) provision an analyzer to process that suspicious object; (iv) load the suspicious object into the virtual server; (v) conduct analytics of each suspicious object within the analyzer; and (vi) report the results of the analytics. As described, these operations (iii)-(vi) associated with the virtualized analysis system may be conducted by the cybersecurity agent; however, as an alternative embodiment, some or all of these operations (iii)-(vi) may be conducted by logic that is different from the cybersecurity agent, but is operating in cooperation therewith. For instance, the cybersecurity agent may detect and supply suspicious objects to the virtualized analysis system, but the virtualized analysis system operates within another network device, within a public cloud network, or the like.

Continuing with the illustrative example described above, upon identifying the object is a PHP file and thereby "suspicious," the cybersecurity agent (or other logic) may provision the virtual server of the virtualized analysis system with a PHP scripting engine to translate contents the PHP file into executable code. Similarly, the cybersecurity agent may provision the virtual client with PHP software (e.g., application, libraries, software development kits, or the like) to support communications with the virtual server.

According to one embodiment of the disclosure, after provisioning the virtual server and the vitual client, the suspicious object is loaded into the virtual server prior to detonation of the suspicious object or as part of the detonation technique. The detonation of the suspicious object may include processing of the suspicious object and orchestrating (organizing and/or sequencing) communications between the virtual server and the virtual client (e.g., sending commands from the virtual client, responding to messages caused by the object operating on the virtual server, etc.). These communications may cause the object to perform unexpected, abnormal or inconsistent events indicative that the object is associated with a cybersecurity threat such as a web shell attack (e.g. increased privileges request message, commands outside normal operations of the suspicious object, increased downloading, attempted network connections, attempts reads from a secure memory location, etc.).

Additionally, the virtualized analysis system may examine the end states of the virtual server and virtual client to determine what changes have occurred within the virtualized analysis system after detonation. New login accounts or passcodes, backdoors, or other suspicious activity can be more easily determined via comparison between content representing the starting state of the virtualized analysis system and content representing the current state of the virtualized analysis system. Finally, the virtualized analysis system may detect additional "dropped" objects that are introduced as a result of the detonation (processes created during processing), which may then also be analyzed by the virtualized analysis system for the presence of malware. These additional analytics may be supportive in determining whether a suspicious object is part of a web shell attack, where the collective analytics may generate an overall threat assessment score to determine whether the suspicious object is malware, and more specifically, a web shell script.

To provide a more robust cybersecurity system, a first threat assessment score generated by the virtualized analysis system may be considered with a second threat assessment score produced by conventional static analytics of the same object. The second threat assessment score is determined from an inspection of the characteristics of the object, without its execution. These characteristics may be used to determine whether the object under analysis is associated with a cybersecurity threat such as a web shell attack. The static analytics also may be relied upon to assist in selecting a software profile for provisioning the virtual server and virtual client as described above, including selection of its particular operating system (OS) and application configuration, scripting engines, or the like. One example of static analytics is described in U.S. patent Ser. No. 10/033,747, entitled, "System and Method For Detecting Interpreter-Based Exploit Attacks" issued on Jul. 24, 2017, the disclosure of which is hereby incorporated by reference in its entirety.

In a number of embodiments, correlation logic implemented within the cybersecurity system can analyze these threat assessment scores to generate the "overall" threat assessment score, which can be evaluated against a set of rules and/or thresholds (e.g., prescribed thresholds or dynamic thresholds that may vary depending on a variety of metrics such as the object type or the software profile used in provisioning the virtualized analysis system). These rules and thresholds may be changed or updated periodically or aperiodically in response to, for example, various new threats or current conditions of the cybersecurity system. When a suspicious object is determined to be malicious, the cybersecurity system can take remedial action including, but not limited or restricted to, issuing an alert, deleting, or otherwise quarantining the malicious object.

In lieu of the cybersecurity system being configured to include a virtualized analysis system having a single analyzer as described above, the cybersecurity system may include a second embodiment of the virtualized analysis system, which features multiple (two or more) analyzers. For this embodiment of the virtualized analysis system, a first analyzer is provisioned to operate as a virtual server while a second analyzer is provisioned to operate as a virtual client. The provisioning of the first analyzer is conducted separately from the provisioning of the second analyzer. However, the overall operations of the virtualized analysis system would be consistent with a virtualized analysis system having the single analyzer.

According to another embodiment of the disclosure, the cybersecurity system may operate as a "cybersecurity appliance," namely a network device configured to conduct analytics on one or more objects (defined below) to determine whether any of the objects constitute a cybersecurity threat such being part of a web shell attack. Similar to the operations of the cybersecurity agent described above, the cybersecurity appliance may be configured to receive, as input, objects for analysis and meta-information associated with those objects, and for each object, (i) determine whether the object is suspicious, (ii) provision the virtual machine(s) to process that suspicious object, (iii) load the suspicious object into a virtual server provisioned within the virtual machine(s), (iv) conduct analytics of suspicious object within the analyzer, and/or (v) report the results of the analytics.

It is understood that the cybersecurity system and process described herein provide for a more efficient and more successful method of detecting cybersecurity threats posed to any network device such as a server, including web shell attacks, through the use of a virtual client and virtual server. The monitoring of the virtual communication between the virtual client and virtual server, along with examining any subsequently created objects, and end-states can provide a more accurate threat assessment of suspicious objects, therein facilitating the practical application of providing more safety, uptime, and control to all types of networks including enterprise networks.

I. Terminology

In the following description, certain terminology is used to describe features of the invention. For example, in certain situations, the terms "logic" and "engine" are representative of hardware, firmware or software that is configured to perform one or more functions. As hardware, logic (or engine) may include circuitry such as one or more processors (e.g., a microprocessor, one or more processor cores, a programmable gate array, a microcontroller, an application specific integrated circuit, etc.), wireless receiver, transmitter and/or transceiver circuitry, semiconductor memory, combinatorial logic, or other types of electronic components.

As software, logic (or engine) may be in the form of one or more software modules, such as executable code in the form of an executable application, a script, an application programming interface (API), a subroutine, a function, a procedure, an applet, a servlet, a routine, source code, object code, a shared library/dynamic load library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but is not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the logic (or engine) is stored in persistent storage.

The term "malware" is directed to software (e.g., script such as a web shell script, process, application, routine, or series of instructions) that produces an undesirable behavior upon execution, where the behavior is deemed to be "undesirable" based on customer-specific rules, manufacturer-based rules, or any other type of rules formulated by public opinion or a particular governmental or commercial entity. This undesired behavior may include a communication-based anomaly or an execution-based anomaly that (1) alters the functionality of an electronic device executing that application software in a malicious manner; (2) alters the functionality of an electronic device executing that application software without any malicious intent; and/or (3) provides an unwanted functionality which is generally acceptable in other context.

The term "object" generally refers to content in the form of an item of information having a logical structure or organization that enables it to be classified for purposes of analysis for malware or an address (pointer) to where such content is stored. One example of the object may include an email message or a portion of the email message. Another example of the object may include a storage file or a document such as a PHP, ASP or JSP file or other dynamic file, a word processing document such as Word® document, or other information that may be subjected to cybersecurity analysis. The object may also include an executable such as an application, program, code segment, a script, dynamic link library "dll," URL link, or any other element having a format that can be directly executed or interpreted by logic within the electronic device.

The term "transmission medium" may constitute a physical or virtual communication link between two or more systems. For instance, the transmission medium may correspond to a physical (wired or wireless) communication link between two or more network devices (defined below). The physical communication link may include electrical wiring, optical fiber, cable, bus trace, or a wireless channel using infrared, radio frequency (RF), or any other wired/wireless signaling mechanism. Alternatively, the transmission medium may correspond to a virtual communication link that provides logical connectivity between different logic (e.g., software modules).

The term "network device" should be generally construed as an electronic device with data processing capability and/or a capability of connecting to any type of network, such as a public network (e.g., Internet), a private network (e.g., a wireless data telecommunication network, a local area network "LAN", etc.), or a combination of networks. Examples of a network device may include, but are not limited or restricted to, the following: a server or other stand-alone electronic device, cybersecurity appliance, a mainframe, a firewall, a data transfer device (e.g., router, switch, modem, bridge, etc.), an info-entertainment device, a vehicle, a medical device, a client device (endpoint) such as a laptop, a smartphone, a tablet, a desktop computer, a netbook, gaming console or gaming accessory, or any general-purpose or special-purpose, user-controlled electronic device. In many embodiments, the term "network device" may be used synonymously with the term "electronic device."

The term "message" generally refers to signaling (wired or wireless) as either information placed in a prescribed format and transmitted in accordance with a suitable delivery protocol or information made accessible through a logical data structure such as an API. Hence, each message may be in the form of one or more packets, frame, or any other series of bits having the prescribed, structured format.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. General Architecture

Referring to FIG. 1, an exemplary system diagram of a communication network 100 is shown. The communication network 100 includes a plurality of network devices 120, 130, 140, 150 in communication over a network 110. As shown, network devices 130 and 140 correspond to cybersecurity appliances while each network device 120, 150 includes a cybersecurity agent 125, 155, respectively. The cybersecurity agent 125, 155 are loaded and executed on the network devices 120 and 150 to analyze objects and detect cybersecurity threats (e.g., malicious web shell script). The network 110 may encompass any type of network including, but not limited to, a public network (Internet) or a private network (e.g., a local area network). The network devices 120, 130, 140, 150 are communicatively coupled together via the network 110, albeit the network device 120 is implemented within a (customer) network 122 and network device 150 is coupled to the network 110 via another intermediary network 160.

According to one embodiment of the disclosure, each cybersecurity appliance 130 or 140 may be implemented as or on a stand-alone network device that is implemented with logic to detect a cybersecurity threat (e.g., potential infection of network by malware through a web shell attack). More specifically, each cybersecurity appliance (e.g., cybersecurity appliance 130) may be configured to receive, as input, one or more objects (e.g., object 170) for analysis. The cybersecurity appliance 130 may inspect the content of the object 170 and/or meta-information 175 associated with that object 170 to determine whether that object 170 is suspicious. This inspection may be conducted by inspection logic (see FIG. 3) within the cybersecurity appliance 130, where the inspection logic generates a threat assessment score based on the level of compliance (or non-compliance) of the inspected information with rules formulated to identify characteristics associated with known malicious objects and/or known benign objects. When the threat assessment value exceeds a first threshold, the object 170 is deemed "suspicious," prompting a more detailed analysis of the object 170 within a virtualized analysis system as described below.

Each cybersecurity agent 125 or 155 may be implemented as software installed on a respective network device 120 or 150, where the software conducts run-time threat detection on an object in effort to determine whether the object is a cybersecurity threat (e.g., web shell attack). In particular, each cybersecurity agent (e.g., agent 125) may be configured, at least, to (i) receive, as input, an object 180 and/or meta-information 185 associated with that object 180 for analysis, and (ii) determine whether the object 180 is suspicious. Similar to the above-described operability of the cybersecurity appliance 130, the cybersecurity agent 125 may conduct a rule-based inspection of the content of the object 180 and/or meta-information 185 to determine whether that object 180 is suspicious. If so (e.g., the threat assessment value exceeds the first threshold), the object 180 is deemed "suspicious," similarly causing a more detailed analysis of the object 180 within a virtualized analysis system described below.

As an illustrative example of the inspection process, a cybersecurity system 125/130 (e.g., the cybersecurity agent 125 or inspection logic within the cybersecurity appliance 130) may inspect, in accordance with one or more detection rules (not shown), content of the object 180/170 and/or meta-information 185/175 associated with the object 180/170 to determine whether the object 180/170 is a script or a particular script type. For example, one of the detection rules may conclude that the object 180/170 is deemed to be "suspicious" if the object's extension, being part of the meta-information 185/175, corresponds to a particular script (e.g., a ".php" extention identifying that the object is a PHP file widely used to conduct a web shell attack). Hence, upon inspection of the extension of the object 180/170 and uncovering a ".php" extension, the cybersecurity system 125/130 determines that the object 180/170 is "suspicious." It is contemplated that the detection rules may be configured for use in identifying PHP files as described above, or even other script types (e.g., ASP or JSP files) included as part of the object 180/170.

Besides suspicious object detection, the cybersecurity agent 125 may be further configured to (iii) provision an analyzer to process that suspicious object 180; (iv) load the suspicious object 180 into the virtual server; (v) conduct analytics of at least the suspicious object 180 including an analyzer; and (vi) report the results of the analytics via the network 110. As described, these operations (iii)-(vi) may be conducted by the cybersecurity agent 125; however, as an alternative embodiment, some or all of these operations (iii)-(vi) may be conducted by logic that is different from the cybersecurity agent 125, but is operating in cooperation therewith. For instance, the cybersecurity agent 125 may perform real-time analysis of the content of the object 180 and/or its meta-information 185 to determine whether the object 180 is "suspicious;" however, the "behavioral" analytics of the object 180 may be conducted by one of the cybersecurity appliances 130 or 140, logic 195 within a public cloud network 190, or the like.

In a variety of embodiments, a customer network 145 may be in communication with an external cybersecurity appliance 140. These embodiments may be useful for situations where a customer network 145 is already established and cannot accommodate a direct integration with a cybersecurity appliance. In other embodiments, the cybersecurity appliance 140 may be a third party device licensed, leased, or otherwise provided to the customer network 145 for use. In still further embodiments, the cybersecurity appliance 140 may be positioned between the customer network 145 and the network 110, such that all incoming messages and network content traveling over the network 110 are inspected for cybersecurity threats before arriving within the customer network 145.

In numerous embodiments, the intermediary network 160 may be in communication with an external cybersecurity agent 155. In still additional embodiments, the intermediary network 160 may receive network content and pass along suspicious objects to the cybersecurity agent 155, which may perform analytics on the suspicious objects prior to saving or execution. In these cases, the intermediary network 160 may deploy servers or other network devices that feature logic (e.g., software, rules-based engine, etc.) that, under certain conditions, redirects network content to the cybersecurity agent 155. By way of example and not limitation, the intermediary network 160 may already have a cybersecurity system installed that functions but otherwise lacks the ability to successfully detect and/or eliminate web shell attacks. In these cases, the previously installed cybersecurity system of the intermediary network 160 may be communicatively coupled to the network device 150 and its cybersecurity agent 155 that can be tasked with supplementing the pre-installed cybersecurity system by evaluating scripts to detect a web shell attack. Such outsourcing of threat evaluation can be executed remotely and also be provided in a Software as a Service ("SaaS") model.

In some embodiments, the transfer of suspicious objects may be done within a private enterprise network. As a result, the cybersecurity system may be configured to detect, monitor and analyze the transfer of suspicious objects between multiple network devices operating within a single customer network (east-west traffic). Likewise, the cybersecurity system may be configured to detect, monitor and analyze the transfer of suspicious objects residing in different networks devices, such as a first network device may be deployed within a customer network and a second network device may be deployed outside of the customer network (e.g., another local area network, a cloud network, etc.).

It would be understood by those skilled in the art that although certain embodiments are highlighted in discussion of FIG. 1, a wider variety of embodiments are possible and contemplated by this application. In fact, based on the desired application and layout, a mixture of customer networks and cybersecurity systems can be achieved in order to detect web shell attacks. Customer networks are described in more detail below.

Figure 2:
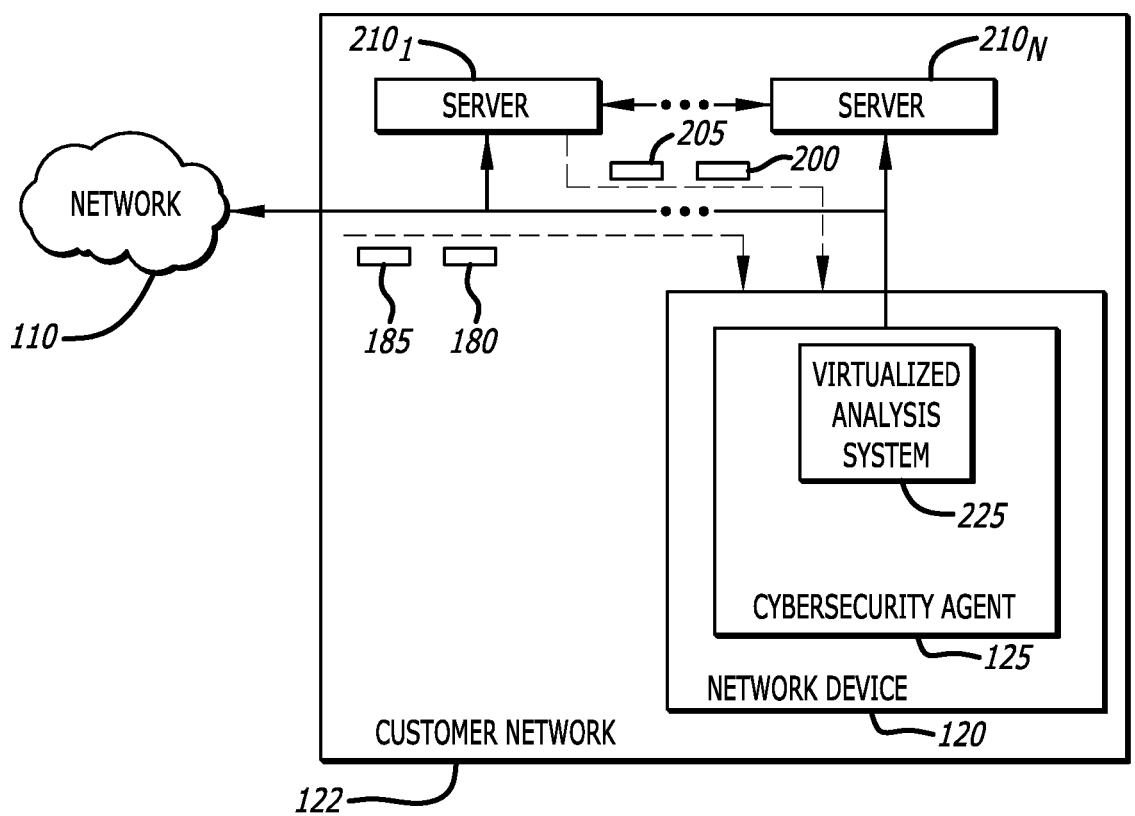
FIG. 2 depicts an exemplary block diagram of a network deploying a cybersecurity agent configured to detect a cybersecurity threat such as a web shell attack.

Referring now to FIG. 2, an exemplary block diagram of the network 122 deploying the cybersecurity agent 125 installed within the network device 120 is shown. Herein, the network 122 features the network device 120 along with a plurality of network devices $210_1$-$210_N$. As shown, the network devices $210_1$-$210_N$ (N≥1) are represented as servers; however, it is contemplated that these network devices may correspond to other types of electronic devices such as client devices. It should be understood that the number of servers within a network 122 may vary based on the type of network and application desired. Each of the servers $210_1$, $210_N$ may be in communication with each other as well as to other network devices on the network 122.

As shown, the network 122 is in communication with the network 110 to receive one or more objects and/or their corresponding meta-information (e.g., object 180 and/or meta-information 185) directed to the network device 120. As shown, the network device 120 includes the cybersecurity agent 125, namely software installed within the network device 120 and operating in the foreground or background to detect cybersecurity threats such as web shell attacks. Additionally, the network device 120 may receive one or more objects (e.g., object 200) from one of the servers $210_1$-$210_N$ along with its corresponding meta-information 205 for analysis. The cybersecurity agent 125 is configured to receive and analyze the incoming objects 180, 200 to determine whether such objects are part of a cybersecurity threat (e.g., web shell attack). In particular, for analysis of object 180 for example, the cybersecurity agent 125 may be configured to at least (i) receive the object 180 for analysis and its associated meta-information 185, and (ii) determine whether the object 180 is suspicious based on the content of the object 180 and/or the meta-information 185.

As described above, the cybersecurity agent 125 may be configured to collect content and meta-information 185 associated with the object 180 and inspect the collected information for particular characteristics (e.g., content that is highly susceptible to web shell attacks such as a script, specific data patterns or sequences, deviations in messaging practices (structure, format or ordering informalities, increased messaging attempt, etc.)) that, individually or collectively, suggest that the object 180 is "suspicious." Of course, it is contemplated that the "suspiciousness" determination may be made using the content of the object 180, where the meta-information 185 is only collected after the object 180 is deemed suspicious, where the meta-information 185 is provided with the object 180 to a virtualized analysis system 225.

Figure 4:
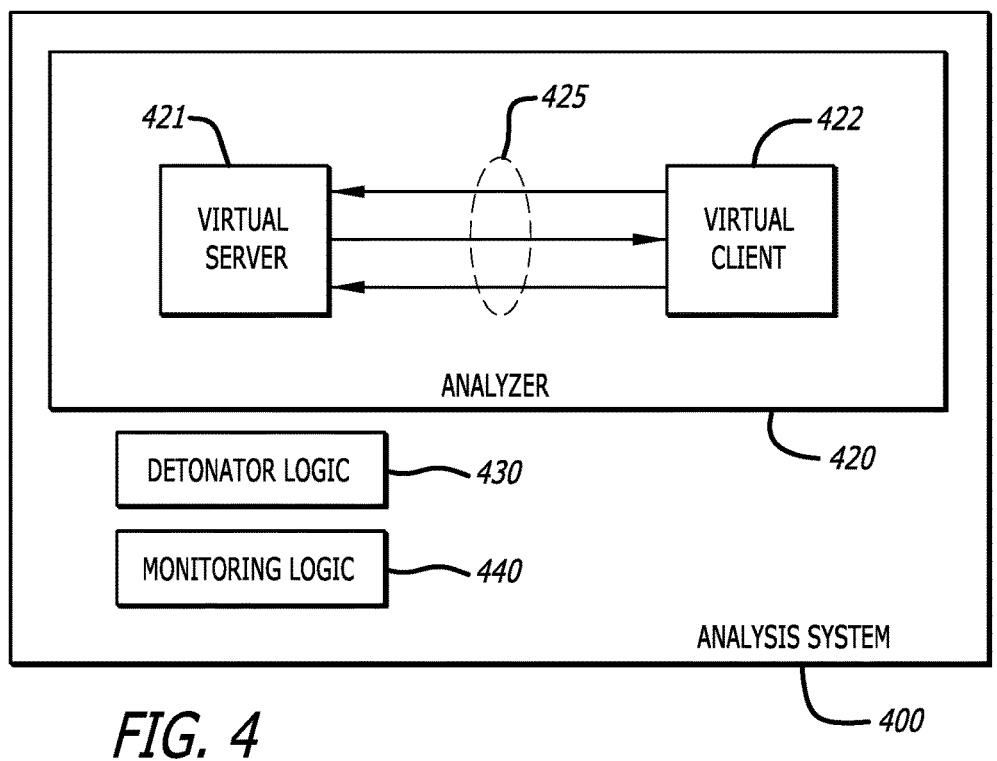
FIG. 4 depicts an exemplary embodiment of a virtualized analysis system implemented with a single analyzer comprising a virtual client and virtual server in accordance with an embodiment of the invention.
Figure 5:
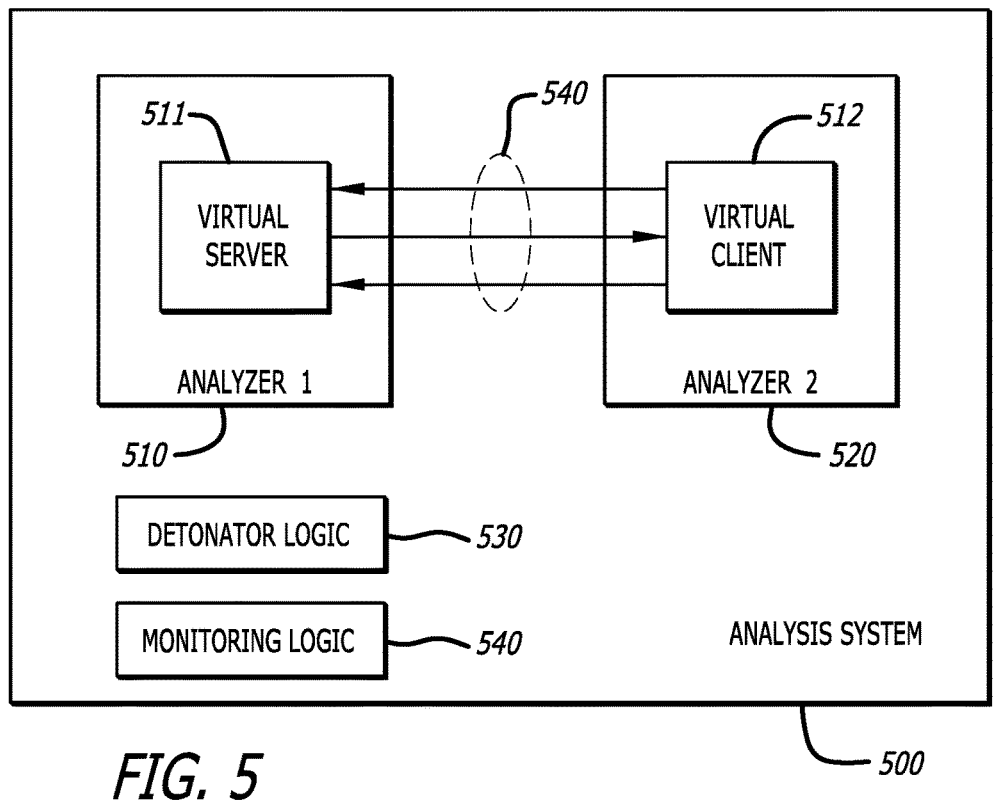
FIG. 5 depicts an exemplary embodiment of a virtualized analysis system implemented with a first analyzer featuring a virtual server and a second analyzer featuring a virtual client in accordance with an embodiment of the invention.

As shown in detail in FIGS. 4-5 (identified as virtualized analysis system 400 and 500 therein), the virtualized analysis system 225 includes a virtual server (software representation of a physical server) communicatively coupled to a virtual client (software representation of physical resources associated with a client device). Herein, where the object 180 is deemed suspicious, the cybersecurity agent 225 may be further configured to provision the virtual server and virtual client within the virtualized analysis system 225 and load the suspicious object 180 into the virtualized analysis system 225.

The virtualized analysis system 225 detonates the suspicious object 180, and thereafter, monitors events that occur during the processing of the suspicious object 180. Herein, according to one embodiment of the disclosure, the detonation of the suspicious object 180 may include orchestrating communications between the virtual server and the virtual client (e.g., sending commands from the virtual client, responding to messages from the object, etc.), which may prompt the suspicious object 180 to perform unexpected, abnormal or inconsistent events indicative of a cybersecurity threat such as a web shell attack. Examples of these unexpected, abnormal or inconsistent events may include, but are not limited or restricted to an increased number of privilege request messages, receipt of commands outside normal operations of the suspicious object, increased attempts to download content from any of servers $210_1$-$210_N$, attempted network connections, attempted reads from a secure memory location, or the like.

After denotation of the suspicious object 180, logic within the virtualized analysis system 225 monitors behaviors (events) occurring within the virtualized analysis system 225 (e.g., virtual server, virtual client, etc.) and conduct analytics on the monitored events. The analytics may involve analysis of events conducted by the virtual server and virtual client during processing of the suspicious object 180, especially an analysis of the events being communicated between the virtual server and the virtual client. After completion of the analytics, results may be reported to one or more administrators with suitable credentials to receive such results.

Additionally, the virtualized analysis system 225 may be configured to examine the end state of the virtualized analysis system, notably the virtual server and virtual client, to determine what changes have occurred within the virtualized analysis system 225 after detonation. Certain activities, such as the creation of new login accounts, changes to passcodes, backdoor creations, or other activities that attempt to alter access restrictions, can be more easily determined via comparison between the starting state of the virtualized analysis system 225 (virtual server, virtual client) versus its current states. Also, the virtualized analysis system 225 may detect additional "dropped" objects that are introduced as a result of the detonation (objects, such as processes or other scripts and/or files created during processing), which may then also be analyzed by the virtualized analysis system 225 for the presence of web shell script. These additional analytics may assist in the determination as to whether the suspicious object 180 constitutes a cybersecurity threat (e.g., part of a web shell attack). Each of these analytics (e.g., event analytics, state change analytics, and/or dropped object detection analytics) may generate a corresponding threat assessment score, and based on a collection of some or all of these analytics, the virtualized analysis system 225 may generate an overall threat assessment score to determine whether the suspicious object is malware, and more specifically, web shell script.

To provide a more robust cybersecurity system, the overall threat assessment score generated by the virtualized analysis system 225 may be combined with a threat assessment score generated by the cybersecurity agent 125 during inspection of characteristics of the object 180 and/or meta-information 185 during the determination as to whether the object 180 is "suspicious."

In a number of embodiments, the cybersecurity agent 125 implemented within the network device 120 can utilize the above-described threat assessment scores to generate the "final" threat assessment score, which can be evaluated against a set of rules and/or thresholds (e.g., prescribed thresholds or dynamic thresholds that may vary depending on a variety of metrics such as the object type or the software profile used in provisioning the virtualized analysis system). These rules and thresholds may be changed or updated periodically or aperiodically in response to, for example, various new threats or current conditions of the cybersecurity system. When the suspicious object 180 is determined to be malicious, the cybersecurity agent 125 may cause the network device 120 to take remedial action including, but not limited or restricted to, issuing an alert, deleting, or otherwise quarantining the suspicious object 180.

In some embodiments, as shown, the cybersecurity agent 125 may be deployed within a network device that is not a server including, but not limited to, a mainframe, a firewall, a data transfer device (e.g., router, switch, modem, bridge, etc.) or a client device. In other embodiments, the cybersecurity agent 125 may be operated on one of the plurality of servers.

Figure 3:
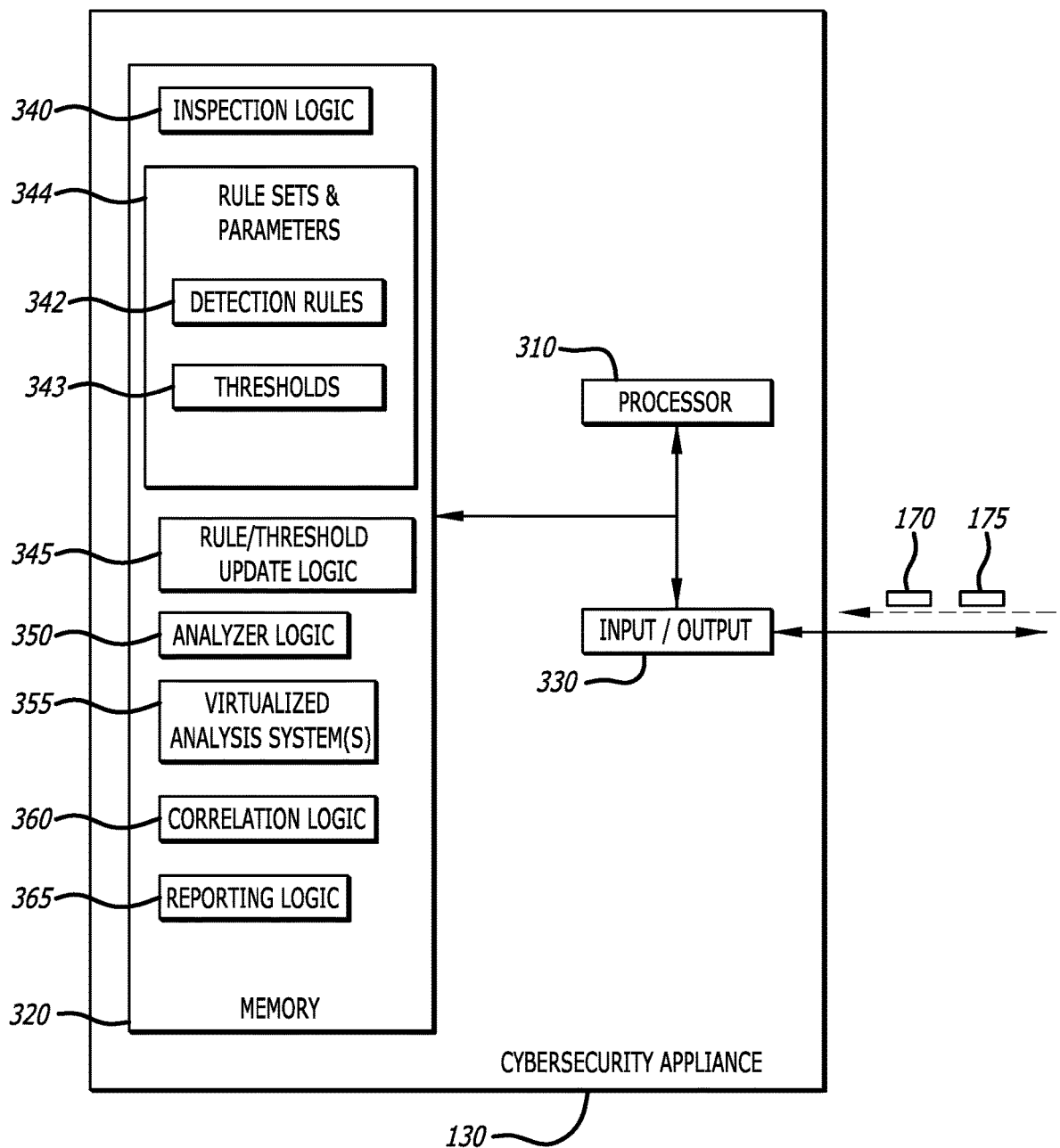
FIG. 3 depicts an exemplary block diagram of a network deploying a cybersecurity appliance configured to detect a cybersecurity threat such as a web shell attack.

Referring to FIG. 3, an exemplary block diagram of a cybersecurity system deployed as a cybersecurity appliance in accordance with an embodiment of the invention is shown. The cybersecurity appliance 300 may be similar in architecture to the cybersecurity appliances 130, 140 depicted in FIG. 1. The cybersecurity appliance 300 comprises one or more processors (e.g., CPU) 310, which is coupled to communication input/output interfaces 330 as well as to a persistent memory system 320. According to one embodiment of the disclosure, the input/output (I/O) interface 330 may be implemented as a physical interface including one or more ports for wired connectors. Alternatively, the entire cybersecurity appliance 300 may be implemented as software, such as a cybersecurity agent (e.g., cybersecurity agent 125 depicted in FIG. 2) and the input/output interface 330 may be implemented as a digital communication logic between the cybersecurity agent 125 and other software interfaces. Additionally, or in the alternative, the I/O interface 330 may be implemented with one or more radio units or other transmission mediums for supporting wireless communications with other electronic devices.

Within the persistent memory system 320 of the embodiment depicted in FIG. 3, various logics may be provided including, but not limited to, inspection logic 340, rule/threshold update logic 345, analyzer logic 350, correlation logic 360, and reporting logic 365.

In various embodiments, the inspection logic 340 can be utilized to facilitate a preliminary analysis of objects (e.g., object 170 as shown in FIG. 1) for cybersecurity threats. According to one embodiment of the disclosure, the inspection logic 340 retrieves the object 170 and the meta-information 175 associated with the object 170. During or after retrieval, the inspection logic 340 may analyze the characteristics of the object 170 and/or its meta-information 175 (e.g., specific data of the object 170 and/or meta-information 175; specific patterns or sequences of this data, structure, format or ordering deviations, object type, etc.) and determine whether these characteristics comply with one or more detection rules 342 that are updated, based on historical cybersecurity threat information (from the cybersecurity appliance 130 and intelligence from other network devices or third-party systems to determine whether object 170 is "suspicious."

The rule/threshold update logic 345 is responsible for the updating of one or more rule sets and parameters 344, which includes the detection rules 342 and prescribed thresholds 343 used in determining suspiciousness or maliciousness of an object under analysis. The rule sets and parameters 344 may be utilized by the inspection logic 340, analyzer logic 350, correlation logic 360 and/or reporting logic 365, as these rules/parameters may be used to control the functionality of these logic components. The rule sets and/or parameters 344 may be changed or updated periodically or aperiodically in response to, for example, various new cybersecurity threats or current conditions of the cybersecurity system.

As an illustrative example, referring still to FIG. 3, the inspection logic 340 may inspect, in accordance with one or more detection rules 342, an extension associated with the object 170 to determine whether the extension is associated with a known script, such as a ".php" extention to identify that the object is a particular script, namely a PHP file. As the PHP file are frequently used to conduct a web shell attack, the object type being a script would cause the inspection logic 340 to determine that the object 170 is "suspicious".

Response to determining that the object 170 is suspicious, the inspection logic 340 may communicate with (e.g., generate a call to) the analyzer logic 350 to provision one or more virtualized analysis systems 355. In some some embodiments the virtualized analysis systems 355 may be provisioned and instantiated by the analyzer logic 350 and/or in some embodiments the virtualized analysis systems 355 may be persistent. According to one embodiment of the disclosure, the analyzer logic 350 is configured to either (i) receive information pertaining to the data type of the object 170 (hereinafter, "object data type") or (ii) determine the object data type from the content of the object 170 and/or the meta-information 175. Based on the detected object data type, the the analyzer logic 350 may be configured to select a software profile that supports the processing of the suspicious object 170 and provision the virtual server and the virtual client within at least one of the virtualized analysis systems 355 with that software profile. For instance, where the object 170 includes a script, the virtual server within the virtualized analysis system 355 may be provisioned to include one or more scripting engines that effectuates processing of the script. Similarly, the virtual client may be provisioned in accordance with a software profile with script applications, libraries, software development kits, etc.) needed to support communications with the virtual server, or even upload the object 170 into the virtual server.

Stated differently, the analyzer logic 350 can be utilized to generate the virtualized analysis system(s) 355, each including one or more analyzers to evaluate events produced during processing of the object. In certain embodiments, the analyzer logic 350 may examine the object content for an object data type and select a virtual client and virtual server for use in the analyzer logic 350. Furthermore, in some embodiments, the analyzer logic 350 may also examine the meta-information 175 obtained contemporaneously to possibly select a better-suited set of analyzers than would have been selected by using the content from the object 170 alone.

Also, the analyzer logic 350 may generate multiple virtualized analysis systems 355, where at least one virtual component (virtual server or virtual client) for each virtualized analysis system 355 may be provisioned using a different software profile (e.g., different OSes or different versions of the same OS among the virtualized analysis systems 355, different web browser applications or different versions of the same web browser application among the virtualized analysis systems 355, and/or different scripting engines or different versions of the same scripting engine among the virtualized analysis systems 355). As a result, different virtualized analysis systems may be selected to analyze the object within multiple virtual environments. In this way, the analyzer logic 350 may employ multiple types of analyzers to evaluate the suspicious object 170. Additionally, it is contemplated that the multiple virtualized analysis systems may be identically provisioned if different analytic procedures (e.g., different time accelerated analyses based on time (clock) manipulation, different object loading schemes, etc.). Additionally, these multiple analyzers may be operated in a synchronous or asynchronous manner.

In more embodiments, the persistent memory 320 may also comprise correlation logic 360. Correlation logic 360 examines the analytic results from the analyzers within the virtual analysis system 355 and generates threat assessment scores for the analytic results. According to one embodiment of the disclosure, the threat assessment scores may be generated by examining the differences between the various analyzers. By way of example and not limitation, the analytic results can be generated from a variety of analyzers that were instantiated to simulate a number of different configuration settings within the virtual server and client programs. In this way, the threat assessment score data may be formatted and adapted to reflect that various differences in the processing results in the plurality of analyzers.

In many embodiments, reporting logic 365 can be utilized to generate reports, emails, or other communications to an administrator informing her or him of the analytic results determined by the analyzer(s) within the one or more virtualized analysis systems deployed. In some embodiments, the reporting logic 365 may trigger a remedial action based on a predetermined rule set, which may include performing remediation activities including deleting or quarantining the object, blocking the object 170 from delivery to targeted network device or storage, and/or reconfiguring settings within a possibly infested network device to remediate the effects of any web shell attacks until the infected network device can be examined. In still further embodiments, the reporting logic 365 may be updated such that the format or frequency of communications in response to certain detected cybersecurity threats may change and thus yield a different response, especially as different cybersecurity threats as in different web shell attacks, are found to be more harmful or disruptive than others. In further embodiments, the reporting logic 365 may take remedial actions without human intervention.

III. Analyzer Systems

Referring now to FIG. 4, a first embodiment of a virtualized analysis system 400 is shown. The virtualized analysis system 400 features a single analyzer 420, which includes a virtual client 422 and virtual server 421. The analysis system 400 may be capable of generating a plurality of analyzers to evaluate and manipulate suspicious objects, where in some embodiments, the analyzers may be provisioned differently (e.g., different OS, application(s), scripting engine, etc.). Herein, the analyzer 420 may correspond to at least one virtual machine that attempts to open, process, or otherwise operate a suspicious object. In additional embodiments, the analyzer 420 provides a virtual (sandboxed) environment for processing of the suspicious object. In further additional embodiments, the analyzer 420 may generate a hash of the suspicious object for further comparison/analysis to avoid duplicative analysis of identical objects.

As further shown in FIG. 4, the analysis system 400 may generate a single analyzer 420 which is provisioned with the virtual server 421 and the virtual client 422. The virtual server 421 and virtual client 422 may be configured with a virtual communication link (or virtual connection) 425 between the virtual server 421 and the virtual client 422. Events based on operations conducted by the virtual server 421, operations conducted by the virtual client 422, and/or communications over the virtual communication link 425 between the virtual server 421 and virtual client 422 may be monitored by the monitoring logic 440. Commands may be deemed suspicious when these commands are unexpectedly encountered in communications exchanged between the virtual server 421 and virtual client 422 during processing of a suspicious object for analysis data. For example, suspicious commands may include, at least in part, those commands directed to unusual activities that influence operability or promote illicit exfiltration such as adjusting access privileges, downloading data maintained in storage locations designated for sensitive data, specific commands associated with a known web shell attack.

However, it is noted that the virtual client 422 may be configured to follow an orchestrated message transmission scheme that prompt transmission of suspicious commands. Also, the virtual client 422 may attempt to simulate a compromised client device within the appliance or customer network that is, by way of illustrative example, attempting to facilitate a cybersecurity attack on another device, including utilizing a web shell attack. Given knowledge of the orchestrated message transmission schemes, which may be part of the detection rules 342, the resultant commands from the virtual client 422 are expected and would not be viewed as suspicious commands in the analytics.

In certain cases, a cybersecurity attack such as a web shell attack may be triggered by a subsequent command being sent from the virtual client 422 to the virtual server 421. In these instances, monitoring the virtual communication link 425 by the monitoring logic 440 for commands indicative of web shell attacks may yield insights into the potential threat of a suspicious object. Typically, the suspicious object comprising web shell script can be loaded on a virtual server 421, either directly or from the virtual client 422. Herein, the virtualized analysis system 400 may comprise a detonator logic 430 which can aid in the determination of a suspicious object. For example, a web shell attack on a server may be triggered by an activity undertaken at the virtual client 422 such as user interface activity by the user or a web page being launched at the virtual client 422. As a result, the detonator logic 430 may be utilized to provide methods of triggering the suspicious object to determine if it is part of a web shell attack. By way of example and not limitation, the detonator logic 430 may direct the virtual client 422 to send a specific command into the virtual server 421. These commands may simulate interaction with graphical user elements such as a keyboard, mouse or touchpad or may be directed to commands that are utilized in known web shell attacks. As can be understood by those skilled in the art, the detonator logic 430 can provide a variety of methods to attempt to trigger a web shell attack.

It is contemplated that the analysis system 400 may be utilized in various embodiments including in a cybersecurity appliance or a cybersecurity agent. The cybersecurity appliance can be similar to the cybersecurity appliance 130 of FIG. 3 wherein the analyzer logic 350 generates an analysis system 400 utilizing a single analyzer 420 comprising a virtual server 421, virtual client 422, and a monitored virtual communication link 425 between them. In some embodiments, the analyzer comprises a single virtual machine configured to support operability of the virtual server 421, virtual client 422 and the virtual communication link 425. Similarly, the cybersecurity agent can be similar to the cybersecurity agent 125 of FIG. 2 in which the analysis system 225 operates as a virtual environment, which may include the single analyzer 420 including both the virtual client 422 and virtual server 421.

Referring to FIG. 5, a second embodiment of a virtualized analysis system 500 is shown. Unlike the single analyzer deployment in FIG. 4, the virtualized analysis system 500 includes a first analyzer 510 that features a virtual server 511 and a second analyzer 520 that features a virtual client 512. In contrast to the embodiments described in FIG. 4, many embodiments may exist where the virtual server 511 and virtual client 512 are generated on separate analyzers 510, 520. In these embodiments, a virtual communication link 540 may still be instantiated to simulate a physical communication link between a server and a client device. Likewise, a detonator logic 530 can be employed to attempt to trigger activation of a potential web shell script within a suspicious object loaded into either the first analyzer 510 or the second analyzer 520.

It is contemplated that many aspects related to the virtual resources within the virtual analysis system 400 of FIG. 4 are applicable to the virtualized analysis system 500 of FIG. 5. In other words, the virtual server 511, the virtual client 512, the detonator logic 530 and the monitoring logic 540 operate in a similar manner as described in FIG. 4. Similarly, it is also contemplated that various embodiments of the analysis system 500 may be incorporated into one or more cybersecurity appliances and/or cybersecurity agents. Further, the analysis system 500 may be generated by the analyzer logic 350 found within a cybersecurity appliance such as the cybersecurity appliance as taught in FIG. 3. Finally, it would be understood by those skilled in the art that the virtual communication link 540 may be accomplished in a number of ways, including, but not limited to, standard object configured to pass calls to both the virtual server 511 and the virtual client 512.

Although not shown, the cybersecurity system may be provided as a cloud service where the virtual analysis system may be a collection of virtual resources (e.g., one or more virtual compute engines, one or more virtual data stores, etc.) that are not instantiated anew for each object submitted for analysis. In contrast, the virtual analysis systems may be persistent (e.g., long lived and in "hot standby"), awaiting detonation in which communications between some of these virtual resources are conducted to configured to provide a virtual server and a virtual client matching the profile needed to detonate the suspicious object. The rules associated with the detonation technique (i.e. orchestrated communications, etc.) may be maintained within one of the virtual data stores.

IV. Server Attack Detection Process

Referring now to FIG. 6, an exemplary embodiment of a flowchart illustrating a process of detecting cyberattacks on servers utilizing an analyzer that features both a virtual client and a virtual server is shown. In many embodiments, the process 600 begins by inspecting various objects received and inspected by a cybersecurity system (block 610). In certain embodiments, the cybersecurity system may be implemented as an cybersecurity appliance or as a cybersecurity agent. Herein, the inspection may be conducted as a rule-based inspection where compliance or non-compliance with certain rules may be used to determine whether the received object is suspicious. These detection rules may be adjusted based on cybersecurity threat landscape. By way of example and not limitation, one of the detection rules may consider detection of an object under analysis including a script file (e.g., PHP, ASP, or JSP file), the object is labeled "suspicious" and is subsequently loaded into the virtualized analysis system for analysis.

Once an object is deemed "suspicious", the suspicious object may be tagged for subsequent loading into a virtualized analysis system provisioned for processing suspicious objects (block 615). Additionally, a virtualized analysis system is created and provisioned to process the suspicious object further evaluation (blocks 620 and 630). In particular, the virtualized analysis system is provisioned to include a software representation of a server (virtual server), a software representation of a client device (virtual client), and a software representation of a communication link between the virtual server and the virtual client (virtual communication link). The virtualized analysis system may be further provisioned with detonator logic, which is configured to initiate processing of the susplicious object, when loaded into the virtual server and orchestrate communications between the virtual client and the virtual server (e.g., coordinates transmission of commands from the virtual client, coordinates responding to the commands, etc.) that may prompt the suspicious object to perform unexpected, abnormal or inconsistent events indicative of a cybersecurity threat such as a web shell attack.

When the virtual server and virtual client are instantiated as part of the virtualized analysis system, the supicious object loaded into the virtual server (block 640). After the suspicious object is loaded into the virtual server, the detonator logic commences and controls a prescribed interaction (i.e., communications) between the virtual server and the virtual client in attempts to trigger the suspicious object (block 650). These communications may be an orchestated exchange or sequence of messages (e.g., commands, data or control information, etc.). During these communications, monitoring logic is configured to monitor and log information propagating over the virtual communication link between the virtual server and the virtual client. The information may include commands or other activity indicative of a web shell attack (block 660).

Thereafter, analytics are performed on the monitored and logged information to determine whether the logged information includes events that are indicative of a web shell attack. In certain embodiments, the monitored communication and results observed can be correlated to generate a threat assessment score indicative of a threat level (block 670). In response to the threat assessment score being generated, the process 600 evaluates that threat assessment score to determine if it is above a particular threshold, where the threshold may be static based on the type of suspicious activity being analyzed or dynamic based on the recent cybersecurity threat activity (block 680). When the threat assessment score is not above the threshold, the process 600 can end (block 695). When a threat assessment score exceeds a given threshold, at least one responsive action may be taken by the cybersecurity system such as a cybersecurity appliance or a cybersecurity agent (block 690). In some cases, the responsive action is a remedial action to counter the potential threat which may include, but is not limited to, deleting the threatening data, quarantining the threatening data, or generating a report to] administrator regarding the nature of the threat for further action.

In the foregoing description, the invention is described with reference to specific embodiments thereof. It will, however, be evident that various modifications and changes may be made thereto without departing from the broader spirit and scope of the invention as set forth in the appended claims.

What is claimed is:

1. An electronic device for detecting threats within a server, comprising:
 a processor; and
 a non-transitory storage medium communicatively coupled to the processor, the non-transitory storage medium including logic executed by the processor, the logic comprises
  an inspection logic to receive a suspicious object for threat evaluation,
  an analyzer logic to generate an analysis system comprising a first analyzer including a virtual client and a second analyzer including a virtual server, wherein a virtual communication link is established between the virtual client of the first analyzer and the virtual server of the second analyzer, wherein the received suspicious object is loaded into the virtual client of the first analyzer, and
  a detonator logic to trigger the suspicious object within the virtual client,
  wherein the analysis system monitors at least data transferred on the virtual communication link and generates a first threat score based upon the monitored data transferred over the virtual communication link.

2. The electronic device of claim 1, wherein the non-transitory storage medium further comprises:
 a static analysis logic to analyze the suspicious object and generate a second threat score based on an analysis of the suspicious object; and
 a correlation logic to receive the first threat score, the second threat score, and correlate the first threat score and the second threat score to generate an overall threat score.

3. The electronic device of claim 2, wherein the non-transitory storage medium further comprises:
 a reporting logic that compares the overall threat score to at least one threshold and in response to the overall threat score exceeding the at least one threshold, generating at least one remedial action.

4. The electronic device of claim 1, wherein the analysis system further monitors a first end state of the virtual client of the first analyzer and a second end state of the virtual server of the second analyzer and generates a first threat score based upon the monitored data, the first end state, and the second end state.

5. The electronic device of claim 1, wherein the monitored data is scored based on commands sent from the virtual client of the first analyzer to the virtual server of the second analyzer indicative of a web shell attack.

6. The electronic device of claim 1, wherein the triggering of the suspicious object comprises inputting user commands on the virtual client indicative of cybersecurity attacks.

7. A cybersecurity software agent stored within a non-transitory storage medium and configured, upon exection, to detect threats within a server, the cybersecurity software agent comprising:
 an inspection logic stored within the non-transitory storage medium, the inspection logic, when executed, is configured to receive a suspicious object for threat evaluation;
 an analyzer logic stored within the non-transitory storage medium, the anayzer logic, when executed, is configured to generate an analysis system comprising a first analyzer with a virtual client and a second analyzer with a virtual server, wherein a virtual communication link is established between the virtual client of the first analyzer and virtual server of the second analyzer, wherein the received suspicious object is loaded into the virtual client; and
 a detonator logic stored within the non-transitory storage medium, the detonator logic, when executed, is configured to trigger the suspicious object,
 wherein the analysis system is further configured to monitor data transferred on the virtual communication link and generate a first threat score based upon the monitored data transferred over the virtual communication link.

8. The cybersecurity software agent of claim 7, wherein the non-transitory storage medium configured to store the cybersecurity software agent further comprises:
   a static analysis logic to analyze the suspicious object and generate a second threat score based on the analysis of the suspicious object; and
   a correlation logic to receive the first threat score, the second threat score, and correlate the first threat score and second threat score to generate an overall threat score.

9. The cybersecurity software agent of claim 8, wherein the non-transitory storage medium configured to store the cybersecurity software agent further comprises:
   a reporting logic that compares the overall threat score to at least one threshold and in response to the overall threat score exceeding the at least one threshold, generating at least one remedial action.

10. The cybersecurity software agent of claim 7, wherein the analysis system further monitors a first end state of the virtual client of the first analyzer and a second end state of the virtual server of the second analyzer and generates a first threat score based upon the monitored data, the first end state, and the second end state.

11. The cybersecurity software agent of claim 7, wherein the monitored data is scored based on commands sent from the virtual client of the first analyzer to the virtual server of the second analyzer indicative of a web shell attack.

12. The cybersecurity software agent of claim 7, wherein the triggering of the suspicious object comprises inputting user commands on the virtual client indicative of cybersecurity attacks.

13. A cybersecurity software agent stored within a non-transitory storage medium and configured, upon exection, to detect threats within a server, the cybersecurity software agent comprising:
   an analysis system stored within the non-transitory storage medium, the analysis system comprising one or more analyzers including a virtual client and a virtual server, wherein a virtual communication link is established between the virtual client and the virtual server, wherein a suspicious object under analysis is loaded into the virtual client; and
   a detonator logic stored within the non-transitory storage medium, the detonator logic is configured to trigger the suspicious object,
   wherein the analysis system is further configured to monitor data transferred on the virtual communication link and generate a first threat score based upon the monitored data transferred over the virtual communication link.

14. The cybersecurity software agent claim 13, wherein the analysis system monitors events associated with operations of the virtual server or the virtual client or both the virtual server and the virtual client.

15. The cybersecurity software agent of claim 13, wherein the non-transitory storage medium configured to store the cybersecurity software agent further comprises:
   a static analysis logic to analyze the suspicious object and generate a second threat score based on the analysis of the suspicious object; and
   a correlation logic to receive the first threat score, the second threat score, and correlate the first threat score and second threat score to generate an overall threat score.

16. The cybersecurity software agent of claim 15, wherein the non-transitory storage medium configured to store the cybersecurity software agent further comprises:
   a reporting logic that compares the overall threat score to at least one threshold and in response to the overall threat score exceeding the at least one threshold, generating at least one remedial action.

17. The cybersecurity software agent of claim 7, wherein the analysis system comprises a first analyzer with the virtual client and a second analyzer with the virtual server, the analysis system further monitors a first end state of the virtual client of the first analyzer and a second end state of the virtual server of the second analyzer and generates a first threat score based upon the monitored data, the first end state, and the second end state.

18. The electronic device of claim 1, wherein the analysis system monitors events associated with operations of the virtual server or the virtual client or both the virtual server and the virtual client.

\* \* \* \* \*